United States Patent
Marastoni

(10) Patent No.: US 9,636,862 B2
(45) Date of Patent: May 2, 2017

(54) PLANT FOR MAKING CONTAINERS OF THERMOPLASTIC MATERIAL

(71) Applicant: SACMI COOPERATIVA MECCANICI IMOLA SOCIETA' COOPERATIVA, Imola (IT)

(72) Inventor: Daniele Marastoni, San Giovanni In Persiceto (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 84 days.

(21) Appl. No.: 14/361,781

(22) PCT Filed: Nov. 30, 2012

(86) PCT No.: PCT/IB2012/056861
§ 371 (c)(1),
(2) Date: May 30, 2014

(87) PCT Pub. No.: WO2013/080171
PCT Pub. Date: Jun. 6, 2013

(65) Prior Publication Data
US 2014/0327189 A1    Nov. 6, 2014

(30) Foreign Application Priority Data
Dec. 2, 2011  (IT) .............. BO2011A0690

(51) Int. Cl.
*B29C 49/02* (2006.01)
*B29C 49/68* (2006.01)
(Continued)

(52) U.S. Cl.
CPC .............. *B29C 49/02* (2013.01); *B29C 49/42* (2013.01); *B29C 49/6409* (2013.01);
(Continued)

(58) Field of Classification Search
None
See application file for complete search history.

(56) References Cited

U.S. PATENT DOCUMENTS 3,995,990 A    12/1976  Dwyer et al.
4,059,188 A    11/1977  McDonald
(Continued)

FOREIGN PATENT DOCUMENTS

WO    03024693 A1    3/2003
WO    2009127962    10/2009
WO    2011001357 A2    1/2011

*Primary Examiner* — Monica Huson
(74) *Attorney, Agent, or Firm* — Pearne & Gordon LLP

(57) ABSTRACT

A plant for making containers of thermoplastic material in continuous cycle comprises: a rotary molding machine (1) configured to make parisons (2) of thermoplastic material having a body (3) with a closed bottom and a neck (4) which defines an opening; an oven (5) for heating the parisons (2), connected to the molding machine (1) and equipped with heating means (6) operating on the body (3) of the parisons (2); a rotary blow-molding machine (7) configured to receive the parisons (2) heated in the oven (5) and to blow-mold them in molds (8) to make the containers; and a management unit (9) for the plant (10), configured to switch off the oven (5) heating means (6) during a shutdown period of the blow-molding machine (7) but without interrupting the operation of the molding machine (1), so as to enable the parisons (2) located in the oven (5) to cool down during their transit through the oven (5).

19 Claims, 4 Drawing Sheets

(51) Int. Cl.
  *B29C 49/42*  (2006.01)
  *B29C 49/64*  (2006.01)
  *B29C 49/78*  (2006.01)
  B29C 49/06  (2006.01)
  B29C 49/36  (2006.01)

(52) U.S. Cl.
  CPC ...... *B29C 49/6418* (2013.01); *B29C 49/6427* (2013.01); *B29C 49/68* (2013.01); *B29C 49/78* (2013.01); *B29C 49/786* (2013.01); *B29C 49/06* (2013.01); *B29C 49/36* (2013.01); *B29C 2049/024* (2013.01); *B29C 2049/028* (2013.01)

(56) References Cited

U.S. PATENT DOCUMENTS

| | | | |
|---|---|---|---|
| 4,449,913 A * | 5/1984 | Krishnakumar | B29C 45/00 264/161 |
| 4,571,173 A * | 2/1986 | Chang | B29C 49/6409 264/520 |
| 5,876,768 A | 3/1999 | Collombin | |
| 6,620,352 B1 * | 9/2003 | Davis | B29C 49/78 264/40.4 |
| 7,121,821 B2 | 10/2006 | Pickel | |
| 8,556,620 B2 | 10/2013 | Parrinello et al. | |
| 2004/0161486 A1 | 8/2004 | Pickel | |
| 2009/0304370 A1 * | 12/2009 | Dupuis | H05B 1/0263 392/407 |
| 2010/0314806 A1 * | 12/2010 | Haesendonckx | B29C 49/6436 264/535 |
| 2011/0109018 A1 | 5/2011 | Parrinello et al. | |
| 2011/0260370 A1 | 10/2011 | Lize | |
| 2014/0027956 A1 | 1/2014 | Parrinello et al. | |

\* cited by examiner

FIG.6 FIG.6A FIG.6B
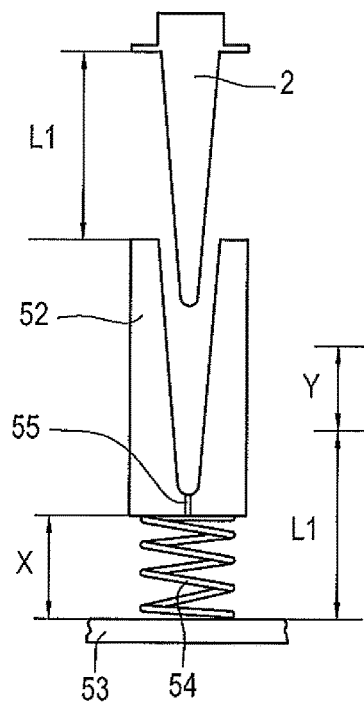
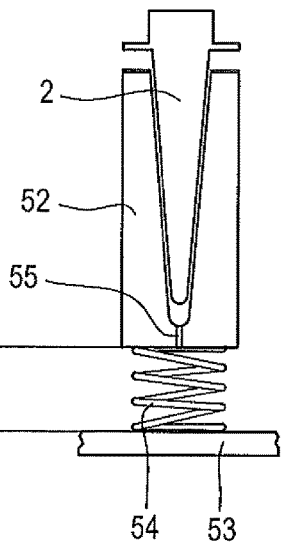
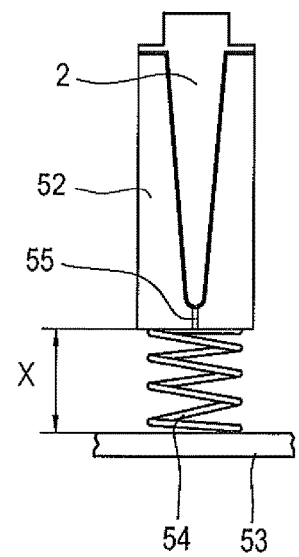
FIG.7 FIG.7A FIG.7B
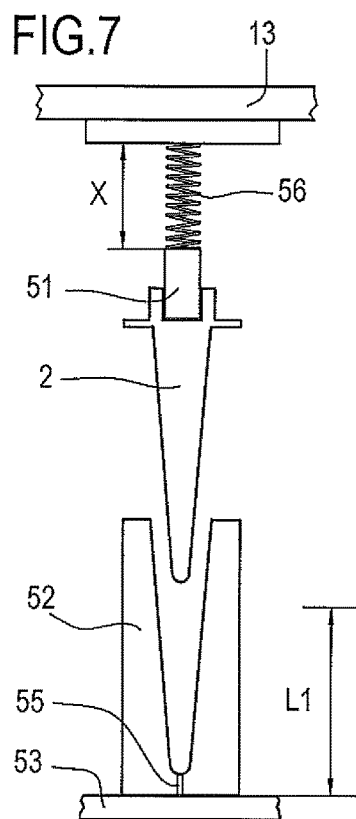
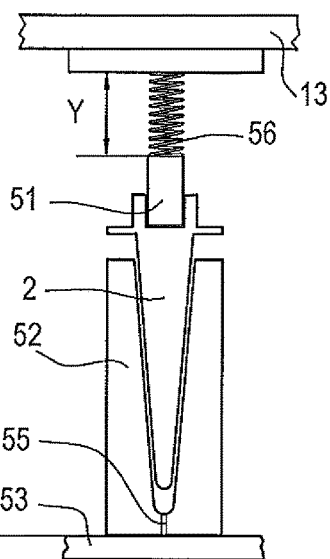
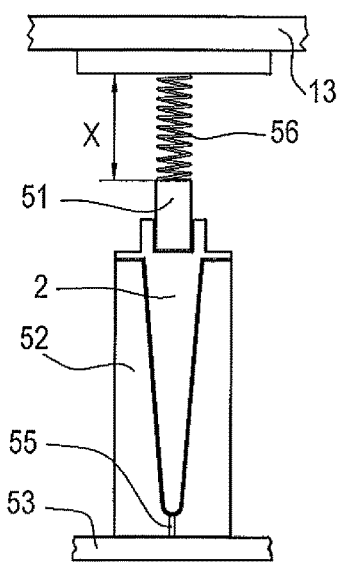

PLANT FOR MAKING CONTAINERS OF THERMOPLASTIC MATERIAL

TECHNICAL FIELD

This invention relates to a plant and a method for making containers of thermoplastic material in continuous cycle.

Generally speaking, the invention relates to the manufacture of plastic containers for beverages.

BACKGROUND ART

In this field, prior art teaches the use of moulding machines for making parisons from thermoplastic material and machines for making the containers from the parisons by blow-moulding the parisons in moulds.

The parison moulding machine may be made according to different constructional types. For example, it may work according to a principle of injection, of injection and compression or of compression of the plastic material.

In the context of parison moulding machines, the term PAM (Preform Advanced Moulding) is also used to denote a system for producing parisons, or preforms, of PET by compression moulding technology.

Moulding machines of this kind are in any case usually rotary machines which make and feed out parisons in continuous cycle.

Usually, the parisons feeding out of the moulding machine are warm as a result of the heat produced during the moulding process just completed.

As to the blow-moulding machine, that is to say, the machine which makes the containers from the parisons by blowing the parisons in moulds, it should be noted that it too is a rotary machine.

In the blow-moulding machine, the parisons are first placed inside blow-moulds, individually or in groups and a fluid under pressure is then blown into each parison in such a way that the parison expands and takes on the shape of the cavity defined by the mould in which it has been placed.

In order to mould the parisons by blowing in this way, the parisons must, when they are fed into the blow-moulding machine, be at a temperature such that the part of each parison to be expanded is just viscous enough to allow it to expand without being damaged.

For this purpose, an oven connected to the outfeed side of the moulding machine and to the infeed side of the blow-moulding machine is used.

The oven is designed to receive the parisons (which are not at the right temperature for blow-moulding) and to heat them so that they can be fed to the blow-moulding machine under optimum temperature conditions for blow-moulding.

In light of this, it should be noted that the parisons have a body with a closed bottom and a neck which defines an opening.

During blow-moulding, the body of the parison must expand, while the neck must remain the same in shape.

Thus, for blow-moulding, the body of the parison must be hot and the neck must be cold (that is, at ambient temperature).

In light of this, it is known (for example from patent document WO03024693A1) that the oven comprises heating means operating in particular on the bodies of the parisons.

Thus, known in the prior art (for example from patent document WO2009/127962 in the name of the same applicant as this invention) is a plant for making containers of thermoplastic material in continuous cycle comprising: a rotary moulding machine for making parisons; an oven for heating the parisons, connected to the moulding machine and equipped with heating means operating on the bodies of the parisons; and a rotary blow-moulding machine configured to receive the parisons heated in the oven and to blow-mould them in moulds to make the containers.

In a plant of this kind, which comprises a combination of a parison moulding machine and a blow-moulding machine, both working in continuous cycle, the problem arises of how to deal with situations where one of the two machines needs to be shut down for a certain length of time, while the other machine is potentially able to continue working.

In view of this, the goal to be achieved is that of maximizing the productivity and efficiency of the plant under all circumstances.

More specifically, the problem to be solved is how to best deal with the situation where the blow-moulding machine stops (due to a breakdown or for any other reason), while the parison moulding machine is in a condition to continue working correctly.

This problem is tackled by patent document WO2009/127962.

Indeed, the plant described in patent WO2009/127962 comprises a transfer carousel, interposed between the blow-moulding machine and the oven and configured to define variable lengths time the parisons, or preforms, remain in the transfer carousel.

This allows the parisons feeding out of the moulding machine to cool down and then, if necessary, stored in a buffer (that is, a storage system or device, accumulation means, or a warehouse). The buffer or warehouse is preferably automatic.

This solution is not, however, free of disadvantages.

One disadvantage is due to the constructional complexity, and hence the cost of the plant, on account of a transfer carousel of this kind.

Another disadvantage is due to the overall dimensions of the plant, again due to the presence of the transfer carousel.

DISCLOSURE OF THE INVENTION

This invention has for an aim to provide a plant and a method that overcome the above mentioned disadvantages of the prior art.

More specifically, the aim of this invention is to provide a plant and a method for making containers of thermoplastic material in continuous cycle, capable of guaranteeing particularly efficient management of the blow-moulding and moulding machines combined with each other, in a particularly simple and inexpensive manner.

Another aim of the invention is to provide a plant and a method for making containers of thermoplastic material in continuous cycle, capable of guaranteeing particularly efficient management of the blow-moulding and moulding machines combined with each other, while limiting the overall dimensions of the plant.

These aims are fully achieved by the plant and method according to the invention as characterized in the appended claims.

More specifically, the plant according to the invention comprises a management unit configured to switch off the oven heating means (or at least to significantly reduce their heating power) during a shutdown period of the blow-moulding machine but without interrupting the operation of the moulding machine, so as to enable the parisons located in the oven to cool down during their transit through the oven. It should be noted that the expression "significantly reduce the heating power of the heating means" is used to mean reducing the nominal heating power of the heating means (during ordinary oven operation in a heating configuration) by at least 60%.

That way, the plant is able to cool the parisons directly in the oven, without having to interpose between the moulding machine and the oven any transfer means defining variable transfer times, or any cooling means.

This advantageously allows the parison moulding machine to be kept in operation even when the blow-moulding machine is shut down, in a plant which is particularly simple, inexpensive and compact (as regards size, that is, overall dimensions).

Preferably, the management unit is configured to switch off the oven heating means (or set them to low heat) automatically in response to machine shutdown signal from the blow-moulding machine.

More specifically, the management unit comprises an electronic control card connected to the blow-moulding machine and to the oven and programmed to receive a signal representing the operation of the blow-moulding machine, in order to switch off the oven heating means automatically in response to a blow-moulding machine shutdown signal.

This advantageously makes it possible to reduce human intervention for the management of the plant and to make management particularly efficient.

Preferably, the oven comprises cooling means for reducing the temperature of the parisons.

Further, the management unit comprises a selector configured to switch the oven between a heating configuration where the heating means are on and the cooling means are off, and a cooling configuration where the heating means are off and the cooling means are on.

This advantageously allows the parisons in transit through the oven to be cooled particularly quickly and efficiently, without waste of energy.

It should be noted that the oven comprises a conveyor configured to transport the parisons along a predetermined path.

Preferably, the conveyor follows a closed, substantially ring-shaped, path.

Preferably, the oven conveyor is made in such a way that the parisons transported by the conveyor along the predetermined path are also placed in rotation about their respective axes, each of which is defined by the extension of the cavity inside the parison.

It should also be noted that the cooling means may be embodies in several different ways.

For example, the cooling means may comprise chambers cooled by the circulation of refrigerant fluids and arranged along the parison conveyor path.

Preferably, the oven cooling means comprise a plurality of nozzles supplied with a refrigerant (or cooling) fluid and configured to generate a flow of the refrigerant fluid directed in such a way as to strike at least a portion of the parisons along at least one stretch of the predetermined path of the parisons in transit through the oven.

It should be noted that the nozzles (at least some of the nozzles) are arranged in such a way that the refrigerant fluid also cools the bodies of the parisons.

Preferably, one or more of the nozzles are located at a fixed position relative to the conveyor so that the parisons travelling along that stretch of the predetermined path are struck by the flow of refrigerant fluid.

In addition or alternatively, one or more of the nozzles are associated with the conveyor so as to move together with the parisons. This advantageously allows the refrigerant fluid to be used in a particularly efficient manner.

More specifically, one or more of the nozzles are arranged in the oven in such a way as to operatively face the neck (that is, the opening) of the parisons so that the cooling fluid is conveyed into the parisons.

Also, preferably, at least one of the nozzles is mounted parallel to a parison axis so as to direct the cooling fluid axially along the parisons. In this configuration, the flow of cooling fluid strikes the parisons axially and flows along the outside and/or inside of it, depending on where the nozzle is positioned relative to the parison itself.

In a variant embodiment (not illustrated), the cooling means comprise a plurality of refrigerated cups (that is, elements having a bottom wall, a side wall and an opening).

Preferably, these cups comprise within them (for example in a gap) a passage through which a refrigerant fluid can flow.

The cups are of a size such that each defines a housing for a respective parison. In other words, each cup is shaped in such a way as to completely surround one parison.

The cups are connected to respective conveyors which move them within the oven to follow the parisons being transported along the predetermined path (or at least part of it).

In light of this, the cups are connected to the same conveyor which transports the parisons or to another conveyor (dedicated to the cups).

Further, each cup is movable along a respective axis (the axis along which the opening of the cup is oriented) towards and away from respective parisons.

Thus, the cups are movable towards and away from respective parisons in a direction at right angles to a plane defined by the movement path of the parisons and of the cups themselves.

Hence, the cups are movable simultaneously along the movement path (synchronously with the parisons) and along the respective axes.

Preferably, the cups are movable along the respective axes (towards and away from the respective parisons) selectively, that is to say, independently of the movement of the other cups towards and away from the parisons.

Thus, each cup is movable between a proximal position close to a respective parison, where the cup surrounds and is preferably in contact with the parison, and a distal position where it is clear of the parison.

When the cup is in the proximal position, it cools the respective parison (preferably by conduction). When the cup is at the distal position, on the other hand, it does not affect the temperature of the parison.

Preferably, the movement path of the parisons lies in a horizontal plane (perpendicular to the action of the weight force) and the cups are movable towards and away from the parisons along vertical axes. Preferably, the cups are located under the parisons, which means that the distal position where they are clear of the parisons is a lowered position (at a lower level) and the proximal position is a raised position (at a higher level).

Preferably, therefore, the cups are raised to be coupled to and cool the parisons and are lowered to the position where they are clear of the parisons.

Preferably, therefore, it is the cups which move towards and away from the parisons. The opposite might be true, however: that is to say, the parisons might be moved relative to the cups along the direction at right angles to the movement path of the parisons and cups within the oven.

Thus, the cups are connected to respective actuators which are set up to control cup movement in the direction towards and away from the parisons.

The cups are also connected to a refrigerating system by which they are cooled.

The cup actuators and the cup refrigerating system are connected to the management unit.

The management unit is programmed to move the cups (not necessarily all at the same time) towards the parisons (until the parisons are inside the cups) when the oven is in the cooling configuration. The management unit is programmed to move the cups (not necessarily all at the same time) away from the parisons (until the parisons are clear of the cups) when the oven is in the heating configuration.

Thus, when the oven is in the heating configuration, the cups are at the distal position (lowered) and the parisons are heated by the heaters (lamps, laser or other system). When the oven is in the cooling configuration, the heaters are off or on low heat and the cups are in the proximal position (raised), in contact with the parisons, in order to cool them.

This configuration of the refrigerating means by which the parisons are cooled with cups is particularly advantageous because it allows the parisons to be "screened" from the heating means when the oven is in the cooling mode in the event that the heaters are not switched off but only on low power (which is preferable to frequently switching the heaters on and off, which is disadvantageous for the working life and reliability of the oven).

As regards the form of the cups, attention is also drawn to the following.

Preferably, the volume defined inside the cup is smaller than the volume occupied by a hot parison (it should be noted that the parisons are hot when they are fed out of the moulding machine).

In light of this, it should be noted that the volume of a parison is considerably reduced when the temperature of the parison drops from the value it has when the parison leaves the moulding machine (for example, around 100 degrees centigrade on the outside of the parison body) to a lower value suitable for the parison to be stored (for example, around 50 degrees centigrade on the same part of the parison).

The cup therefore, besides cooling, preferably also has a function of "shaping" the parison. In effect, the cup is moved towards the parison when the latter is hot and deforms it by interference, giving it a predetermined shape which depends on the internal shape of the cup (that is to say, on the shape of the inside wall of the cup delimiting the space inside the cup).

In other words, the cup has the function of correcting the outer profile (that is, the shape) of the parison, for example with reference to geometric properties such as the straightness of its direction of extension and the circularity, or cylindricity, of the parison (it should be noted that the parisons should be cylindrical but, when they are fed out of the moulding machine, may be slightly out of shape and slightly oval).

In light of this, the cup actuators are preferably configured in such a way that each parison is coupled to the respective cup gradually.

Preferably, the cup actuators (mechanical or electrical, and in any case of active type) are configured to move the cups towards the parisons only for a first predetermined stretch, shorter than the total length of the cup stroke.

In a second and final stretch of the cup stroke towards the parisons, the relative movement of the cups and parisons (towards each other) is caused by a further actuator of passive type.

In light of this, the oven preferably comprises suction means connected to the cups to generate a negative pressure in the space inside the cups with the parisons partially coupled to them.

That way, the cup is set to a "suction" configuration relative to the parison coupled thereto, at first partially, (for example, the parison is inserted into the cup for approximately 70% of its length along the direction of relative movement between the parison and the cup) so that the parison is gradually sucked in as it continues to shrink.

Preferably, the cups have a flared end, defining a tapered shape.

Operatively, when the oven is in the cooling configuration, the operation of the oven is as follows.

Each cup is moved for a first stretch of its stroke in a direction of relative movement towards a corresponding parison until at least one portion of the inside surface of the cup is in contact with a corresponding portion of the parison. That way, a closed space is defined between the cup and the parison. In the first stretch of its stroke, the cup is preferably moved by an active actuator.

The suction means are switched on (they may be turned on a few moments before contact between the cup and the parison) and thus generate a negative pressure in the closed space, creating a suction force which causes the cup and the parison to be drawn together.

Under the action of this suction force, the cup moves along a second stretch of its stroke until the coupling between the cup and the parison is complete.

The suction means are driven by the management unit in such a way that the parison is inserted into the cup in a gradual and controlled manner.

This is important to prevent insertion from taking place too rapidly (with the risk of deforming the parison in an unwanted manner by applying excessive mechanical stress to it) or too slowly (with the risk of the parison shrinking in uncontrolled manner as it cools without the correct shape being imparted to it by contact with the cup). The parison might thus lose contact with the cup and not be cooled down properly.

At the end of the movement path of the parison inside the oven (or at the end of a predetermined stretch of the path), the respective cup is moved away from the parison (by the "active" actuator) to allow the cooled parison to be fed out of the oven towards a storage container. At this stage, suction is preferably switched off.

The storage container may be a buffer (automatic) or, more simply, a specific receptacle (normally an "octabin").

It should be noted that the relative movements between cup and parison might comprise a movement of the cup towards the parison and/or a movement of the parison relative to the cup. This applies to both the first part of the relative movement of cup and parison towards each other (the first stretch of the stroke) and to the second part of the relative movement of cup and parison towards each other (the second stretch of the stroke).

For example, in the first part of the relative movement of cups and parisons towards each other, the cups might be moved, under the action of the active actuators, and in the second part of the relative movement of cups and parisons towards each other, the parisons might be moved, under the action of the suction means or other passive actuators.

In such case, parison pickup and movement means are connected to a part of the oven in such a way as to be movable (by an amount equal to the second stretch of the stroke) in the direction towards the cups, that is, perpendicularly to the movement path of the parison inside the oven.

In this embodiment, therefore, each cup is moved for a first stretch of its stroke in a direction of relative movement towards a corresponding parison until at least one portion of the inside surface of the cup is in contact with a corresponding portion of the parison. That way, a closed space is defined between the cup and the parison. In the first stretch of its stroke, the cup is preferably moved by an active actuator. Next, the parison moves by passive motion (suction effect) inside the cup (since the force that holds it makes it movable also transversely to its feed movement inside the oven).

Thus, the relative movement of cup and parison towards each other comprises a first part (that is, a first stretch of stroke) and a second part (that is, a second stretch of stroke).

The first part of the movement is performed preferably by an active actuator (that is to say, it is driven). This movement is preferably imparted to the cup (that is to say, the active actuator operates on the cup).

The second part of the movement is performed preferably by a passive actuator (that is to say, it is not driven).

In an alternative embodiment, the selfsame active actuator (for example, a movable carrier connected to a pneumatic actuator) might drive the whole movement (thus performing the entire stroke).

In light of this, the oven preferably comprises a plurality of springs (or equivalent elastic means). More specifically, it comprises at least one spring for each parison transporting element, or for each cup.

The springs are connected to the cups and/or to the parison transporting (and pickup) elements, so as to apply an elastic force directed along the axes relative to which the parisons and the respective cups are aligned and movable towards and away from each other.

Thus, the cups are connected to the respective actuators (to the movable carriers) through the agency of the springs and/or the pickup and transporting elements are connected to a conveyor (designed to move the selfsame elements for pickup and transport them along the predetermined path through the oven) through the agency of corresponding springs.

Thus, the springs work by compression, applying a pushing force on the cups relative to the parisons or vice versa, during a (final) part of the relative movement between parisons and cups (towards each other).

In effect, during the movement of cups and parisons towards each other after they have come into contact (at the end of the first stretch of the stroke), the active actuators continue to drive the cups and parisons towards each other in order to complete the second (and final) stretch of the stroke. During the second stretch of the stroke, the springs are compressed because (owing to their calibration) their force is overcome by the mechanical friction created by the interference between the cups and the parisons (this friction generates a force of reaction which opposes the complete insertion of the parisons into the cups).

As the parisons cool down (since they are already partly in contact with the cups) they shrink and the force of reaction (by friction) diminishes and is progressively overcome by the force of the springs, causing the parisons to be inserted completely into the cups.

Thus, the springs guarantee that at least a final part of the movement by which each parison is inserted into the respective cup is performed in a gradual and controlled manner by means of a passive actuator (the spring), that is, by the force of reaction developed by the parison as a function of its own temperature. This is achieved without having to use suction means (and thus simplifying oven construction).

Preferably, therefore, the cups and/or the parison pickup and transporting elements are connected to springs to make them elastically movable in the direction of movement of cups and parisons towards each other.

Preferably, the plant also comprises a buffer, connected to the oven by a conveyor which is configured to transfer to the buffer the parisons cooled by the oven when the heating means are off and the oven is operating in the cooling configuration.

That means that even when the blow-moulding machine is shut down, the production capacity of the parison moulding machine (that is, the machine which makes the parisons) can be used to the full, constituting a store of parisons which, if necessary, might also be transported elsewhere, to feed other blow-moulding machines in other plants (in light of this, it should be noted that not all the plants comprise a parison moulding machine combined with a blow-moulding machine).

The plant preferably also comprises a conveyor configured to transfer the parisons from the buffer to the oven when the heating means are on during a shutdown period of the parison moulding machine.

The parison conveyor running from the buffer to the oven may be an additional conveyor, distinct from the parison conveyor which runs from the oven to the buffer (in which case, both these conveyors may be of a one-way type).

Alternatively, a single, two-way conveyor may be used which transports the parisons from the oven to the buffer and vice versa.

That means the production of the blow-moulding machine need not be stopped when the moulding machine is shut down.

In light of this, the management unit is connected to the buffer and to the conveyor and is programmed to automatically activate oven feed with parisons drawn from the buffer, in response to a machine shutdown signal from the parison moulding machine.

That means continuity of service is guaranteed automatically whether the blow-moulding machine or the parison moulding machine is shut down.

It should be noted that the buffer is preferably configured to feed out and take in parisons through the agency of a further parison transfer system in addition to the aforementioned conveyor. That means parisons produced in excess can be transferred elsewhere or the buffer supplied with parisons produced elsewhere.

In a variant embodiment not illustrated, the oven is a rotary machine; that is to say, the oven comprises a carousel which rotates about an axis.

The carousel is coupled to the parison moulding machine in a feed zone (that is, where the parisons are loaded). Preferably, the parison moulding machine is also a rotary machine and the oven carousel is coupled to the parison moulding machine directly or through a transfer starwheel (infeed).

The carousel is also coupled to the blow-moulding machine, which is in turn a rotary machine, in an outfeed zone (that is, where the parisons are unloaded. This coupling is direct or achieved through one or more transfer starwheels (outfeed).

The oven carousel has a plurality of parison processing stations (spaced angularly, preferably uniformly, round the carousel).

Each station comprises at least one seat (preferably a plurality of seats) for housing at least one respective parison.

The seats comprise hold-down means which keep the parisons inside corresponding cavities (in which the parisons are positioned).

The heating means are coupled to the parison processing stations.

The cooling means are coupled to the parison processing stations.

This invention also provides a method for making containers of thermoplastic material in continuous cycle, comprising the following steps:
- moulding thermoplastic material to make parisons having a body with a closed bottom and a neck which defines an opening;
- heating in an oven the parisons feeding out of the moulding machine;
- blow-moulding in moulds the parisons heated in the oven.

According to the invention, the method comprises a step of switching between the step of heating the parisons in the oven and a step of cooling the parisons in the selfsame oven (or at least significantly reducing the heating of the parisons in the oven), in response to a shutdown of the blow-moulding machine and without interrupting the operation of the moulding machine.

Preferably, the step of cooling the parisons in the oven comprises generating a flow of cooling (or refrigerant) fluid directed along the inside and/or outside of the parison bodies in a direction parallel to the axis of each parison and/or in directions transversal to that axis (it should be noted that the axis of the parison is also an axis of rotation of the parisons along at least one stretch of the path traveled by the parisons within the oven).

Preferably, there is a step of transferring into a buffer the parisons which have been cooled in the oven during the period in which the blow-moulding machine is shut down.

Also, preferably, there is a step of feeding the oven with parisons drawn from the buffer during a period in which the parison moulding machine is shut down.

That allows plastic containers for beverages to be made (moulded) from raw plastic in a continuous process so as to maximize continuity of service and productivity and minimizing the undesirable effects of machine down times when the parison moulding machine and/or the blow-moulding machine is/are shut down.

It should be noted that this invention also provides an oven (that is, a thermal conditioning device for parisons) having the features described in this document.

BRIEF DESCRIPTION OF THE DRAWINGS

This and other features of the invention will become more apparent from the following detailed description of a preferred, non-limiting embodiment of it, with reference to the accompanying drawings, in which:

FIG. 6 schematically illustrates a detail of the plant of FIG. 1;

FIGS. 6A and 6B illustrate the detail of FIG. 6, in two different operating positions, in temporal succession;

FIG. 7 schematically illustrates a variant embodiment of the detail of FIG. 6;

FIGS. 7A and 7B illustrate the detail of FIG. 7, in two different operating positions, in temporal succession.

DETAILED DESCRIPTION OF PREFERRED EMBODIMENTS OF THE INVENTION

Figure 1:
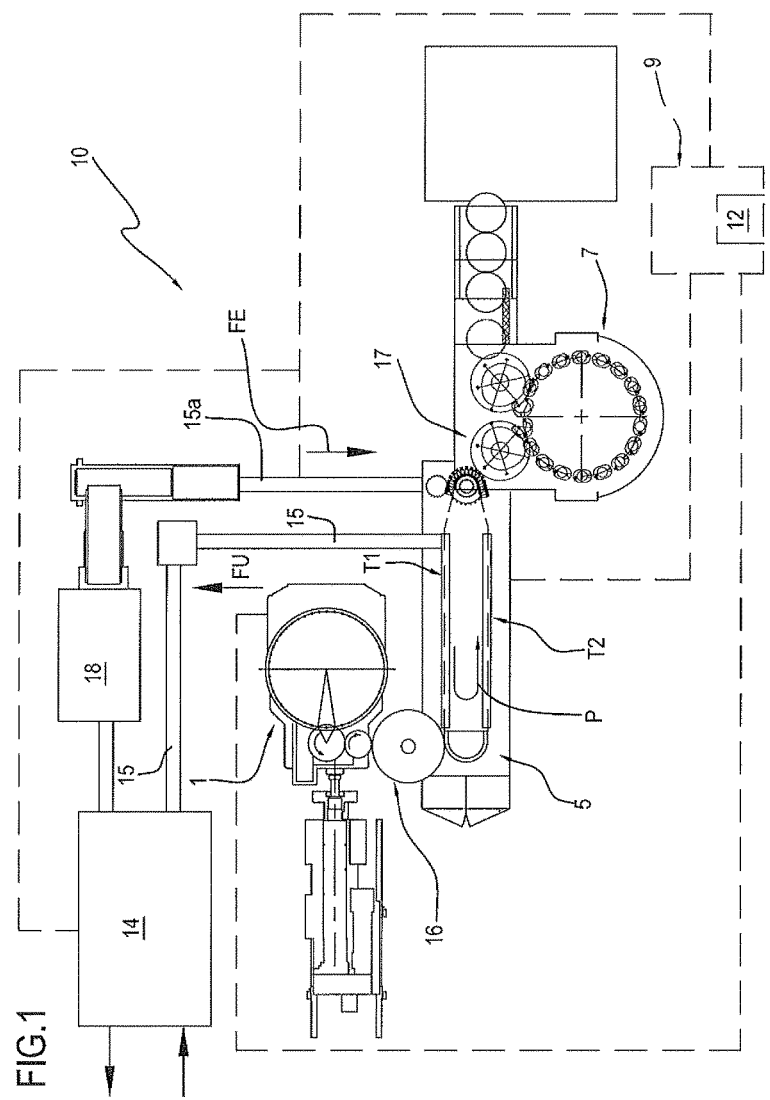
FIG. 1 is a schematic plan view of a plant for making containers of thermoplastic material according to this invention.

With reference to the accompanying drawings, in particular FIG. 1, the plant of the invention is denoted by the numeral 10. The plant 10 is designed to make containers for liquids (not illustrated since they are of known type) from parisons 2 of thermoplastic material (moulded by compression or injection) which, in a subsequent step, are placed in moulds and blow-moulded to obtain the containers for the liquids.

The plant 10 is designed to make the containers in continuous cycle starting from the moulding of the parisons 2.

The moulded parisons 2 comprise a body 3, with a closed bottom, and a neck 4 defining an opening.

In light of this, the plant 10 comprises a rotary moulding machine 1 configured to make the parisons 2 of thermoplastic material.

The moulding machine 1 is not illustrated in detail since it is of a per se known type.

An example embodiment of the moulding machine 1 is described in patent document WO2009127962 in the name of the same Applicant as this invention and which is incorporated herein by reference.

The plant 10 also comprises an oven 5 for heating the parisons 2 and configured to receive the parisons 2 feeding out of the moulding machine 1.

The oven 5 is equipped with heating means 6 operating on the bodies 3 of the parisons 2.

The heating means 6 are embodied, for example, by incandescent lamps (or other heating elements, such as, for example, laser beam emitters) mounted inside the oven 5.

Preferably, the heating means 6 are mounted in one or more heating tunnels T1, T2 of the oven 5.

More specifically, the heating means 6 are mounted on at least one side of the tunnels.

More specifically, a plurality of lamps or other heaters are vertically spaced in such a way as to cover the axial extension of the body 3 of each parison 2.

The oven 5 is coupled to the moulding machine 1 by a carousel 16 for transferring the parisons 2 from the moulding machine 1 to the oven 5.

Preferably, the transfer carousel 16 is particularly simple in construction and transfers the parisons 2 from the moulding machine 1 to the oven 5 in a predetermined, constant time.

The plant 10 also comprises a rotary blow-moulding machine 7 configured to receive the parisons 2 from the oven 5 (where they have been heated) and to blow-mould them in moulds 8 to make the containers. The blow-moulding machine 7, too, is not described in detail since it is of a per se known type in the field of blow-moulding containers from thermoplastic parisons.

The blow-moulding machine 7 is connected to the oven 5 by a second transfer carousel 17 of per se known type.

It should be noted that the oven 5 comprises a conveyor 13 configured to transport the parisons 2 along a predetermined path P within the oven 5.

The path P is preferably in the shape of a ring. The two heating tunnels T1 and T2 are located preferably along the path P.

Preferably, the parisons 2 are moved along the path P by a combination of two movements: a movement imparted by the conveyor 13 along the path P and a rotation of each parison about its own axis of extension Z. The conveyor 13 is described and illustrated schematically since it is of a type known from patent document PCT/IB2010/052937 in the name of the same Applicant as this invention and which is incorporated herein by reference (with particular reference to the conveyor, or means, which moves the parisons in the oven).

According to the invention, the plant 10 comprises a plant 10 management unit 9 configured to switch off the oven 5 heating means 6 (or at least to significantly reduce the heating power of the oven 5 heating means 6) during a period when the blow-moulding machine 7 is shut down but without interrupting the operation of the moulding machine 1.

It should be noted that the expression "significantly reduce the heating power of the heating means" is used to mean reducing the nominal heating power of the heating means (during ordinary oven operation in a heating configuration) by at least 60%.

For simplicity, this description will hereinafter refer to "switching off" the heating means 6 in the oven 5. It will be understood, however, that switching off preferably means total power down but, alternatively, may mean a partial power down.

For example, the management unit 9 comprises an electronic card connected, if necessary, to an electrical panel for powering the plant 10.

It should be noted that the plant 10 management unit 9 is configured to switch off the oven 5 heating means 6 in response to a shutdown of the blow-moulding machine 7 and to keep the heating means 6 off during the period in which the blow-moulding machine 7 remains powered down.

It should be noted that the plant 10 management unit 9 is configured to switch off the oven 5 heating means 6 during a blow-moulding machine 7 shutdown period but without switching off the parison 2 conveyor 13, which continues to operate during the period in which the blow-moulding machine 7 is powered down.

That way, the parisons 2 located in the oven 5 can cool down during their transit through the oven 5.

In other words, the management unit 9 controls the switching off of the heating means 6 to create a transit zone where the parisons 2 are cooled directly in the oven 5.

Preferably, the management unit 9 is configured to switch off the oven 5 heating means 6 in response to a machine shutdown signal from the blow-moulding machine 7.

It should also be noted that in the event of a shutdown of the blow-moulding machine 7, the parisons 2 are inhibited from being transferred from the oven 5 to the blow-moulding machine 7.

Preferably, the inhibiting of parison 2 transfer from the oven 5 to the blow-moulding machine 7 is controlled by the management unit 9.

Preferably, the oven 5 comprises cooling means 11 operating on the parisons 2.

In light of this, the management unit 9 comprises a selector 12 (consisting, for example, of an electric switch controlled by a relay or other electronic switching means) configured to switch the oven 5 between a heating configuration where the heating means 6 are on and the cooling means 11 are off, and a cooling configuration where the heating means 6 are off and the cooling means 11 are on.

Preferably, the cooling means 11 comprise a plurality of nozzles 11a configured to generate a flow F of cooling fluid directed in such a way as to strike the parisons 2 as the parisons 2 move along at least one stretch of their predetermined path P.

Preferably, at least one of the nozzles 11a is located at a fixed position relative to the conveyor 13 so that the parisons 2 travelling along that stretch of the predetermined path P are struck by the flow F of cooling fluid.

Preferably, a plurality of nozzles 11a are located on at least one side of one of the tunnels T1 or T2.

More specifically, the nozzles 11a are vertically spaced in such a way as to cover the axial extension of the parisons 2. This allows the parisons 2 to be cooled down more quickly and uniformly.

In light of this, the nozzles 11a may be located on one or both sides of the tunnels T1 or T2, so that the jets of refrigerant emitted by them strike the parisons 2 in transit on one side only or on both sides, respectively, and according to axes which are transversal to the axes Z of rotation of the selfsame parisons 2.

Preferably, the nozzles 11a are mounted in both of the tunnels T1 and T2 of the oven 5.

Alternatively or in addition, at least one of the nozzles, labelled 11b, is associated with the conveyor 13.

In this case, the nozzle 11b is movable in synchrony with the parisons 2 as the latter are fed forward.

In light of this, the nozzle 11b is preferably mounted parallel to the axis Z of the parisons 2 and is directed towards the neck 4 of the parisons 2 so as to convey the cooling fluid into the parisons 2.

That way, the parisons 2 are cooled very quickly without having to increase the size of the oven 5.

It should be noted that the management unit 9 is connected to the blow-moulding machine 7 and to the oven 5.

In light of this, the management unit 9 is programmed to receive a signal representing the operation of the blow-moulding machine 7, in order to switch off the oven 5 heating means 6 automatically in response to a blow-moulding machine 7 shutdown signal.

In other words, the management unit 9, on receiving a signal indicating that the blow-moulding machine 7 has been shut down, automatically drives the selector 12 in such a way that the oven 5 switches to the cooling configuration.

It should also be noted that the plant 10 comprises a buffer 14 adapted to contain a plurality of parisons 2.

The buffer 14 is connected to the oven 5 by a first conveyor 15 which is configured to transfer the cooled parisons 2 from the oven 5 to the buffer 14 when the heating means 6 are off and the oven 5 is therefore operating in the cooling configuration.

Preferably, the plant comprises a second conveyor 15a, independent of the first conveyor 15 and configured to transfer the parisons 2 from the buffer 14 to the oven 5.

In light of this, the plant comprises a parison 2 orienting device 18 operating on the parisons 2 as they feed into the oven 5.

The parison 2 orienting device 18 is preferably located between the buffer 14 and the oven 5 to position the parisons 2 drawn from the buffer 14 on the second conveyor 15a according to a predetermined orientation.

In light of this, the buffer 14 defines a zone for unloading and storing the parisons 2 after they have been cooled in the oven 5. That means the moulding machine 1 can continue making parisons 2 even if the blow-moulding machine 7 is shut down.

Figure 2:
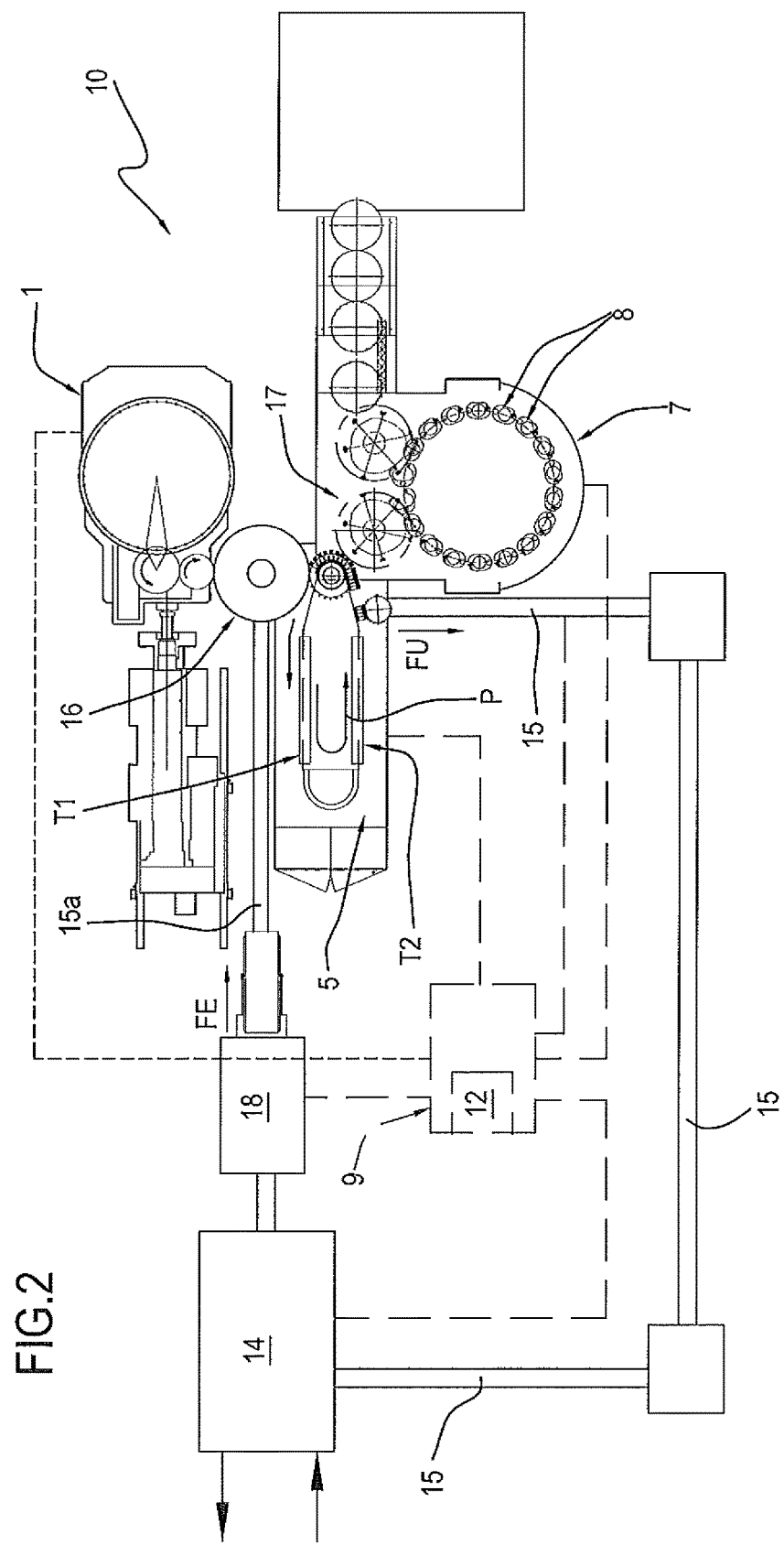
FIG. 2 is a schematic plan view of a variant embodiment of the plant of FIG. 1.
Figure 3:
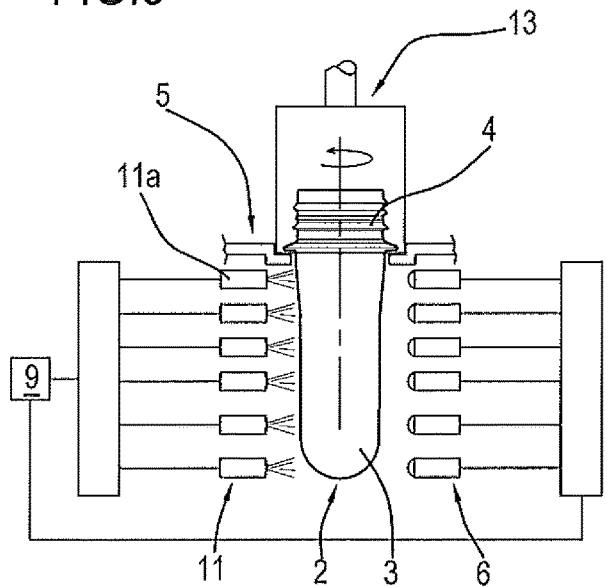
FIG. 3 is a schematic front view, with some parts cut away in order to better illustrate others, showing a detail of an oven of the plant of FIG. 1 and, more specifically, showing fixed, monolateral cooling means for the parisons.
Figure 4:
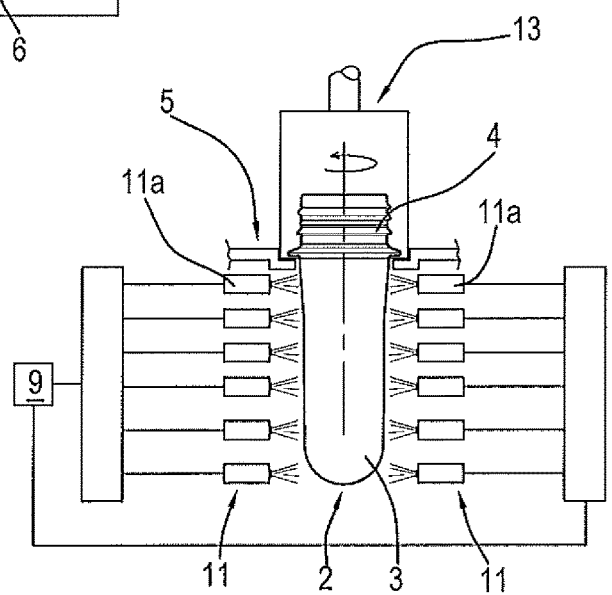
FIG. 4 is a schematic front view, with some parts cut away in order to better illustrate others, showing a detail of the oven of the plant of FIG. 1 and, more specifically, showing fixed, bilateral cooling means for the parisons.
Figure 5:
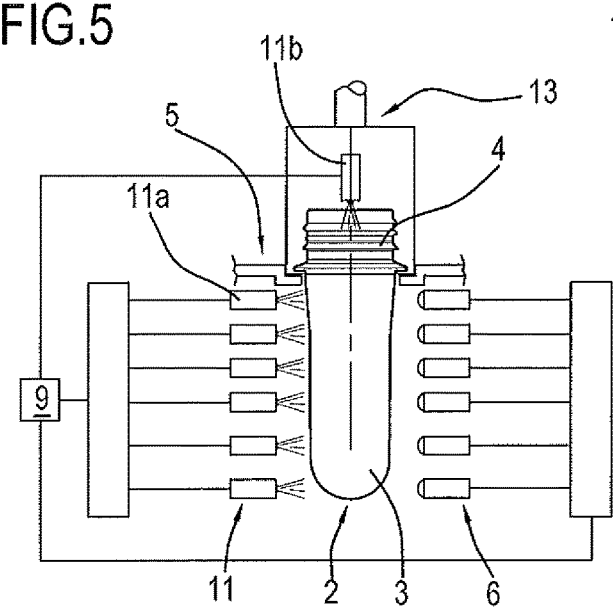
FIG. 5 is a schematic front view, with some parts cut away in order to better illustrate others, showing a detail of the oven of the plant of FIG. 1 and, more specifically, showing moving cooling means for the parisons.

An example of a parison 2 loading/unloading configuration is illustrated in FIG. 2.

In this example, the plant 10 has a medium- to low-productivity oven 5 of small size, where the branches of the path P, and hence the tunnels T1 and T2, extend for a short length.

In light of this, the zones where the parisons 2 feed in and out of the oven 5 are located on opposite sides of the same end of the path P of the oven 5.

In other words, the first carousel 16 for transferring the parisons 2 from the moulding machine 1 to the oven 5, and the second carousel 17 for transferring the hot parisons 2 from the oven 5 to the blow-moulding 7 are located at one end of the oven 5.

In this configuration, the parisons 2 pass through the two short tunnels T1 and T2 to be able to make the parisons 2 suitable for the subsequent blow-moulding stage, where the parisons 2 received by the oven are already warm since they come directly from the moulding machine.

Similarly, when the blow-moulding machine 7 is shut down and with the oven 5 in a configuration for cooling the parisons 2, the stretch of the path coinciding with the two tunnels T1 and T2 allows the parisons 2 to be suitably cooled and transferred to the first conveyor 15. The zone of the conveyor which receives the parisons 2 is located between the end of the tunnel T2 and the zone where the parisons 2 are fed out to the second carousel 17 according to the feed direction P of the parisons 2.

The first conveyor 15 in turn transfers the cooled parisons 2 to the buffer 14 (as indicated by the arrow FU in FIG. 2).

Also in this variant embodiment, the second conveyor 15a connected to the buffer 14 (which the orienting device 18 is connected to) is configured to transfer the parisons 2 from the buffer 14 to the oven 5, when the heating means 6 are on during a machine shutdown period of the moulding machine 1.

In other words, when the moulding machine 1 is stopped, the second conveyor 15a can draw the parisons 2 stored in the buffer 14 and transfer them to the oven 5 operating in the heating configuration (as indicated by the arrow FE) so as not to interrupt feed to the blow-moulding machine 7 and thus keep the plant 10 in operation.

In light of this, the second conveyor 15a is configured to feed the first carousel 16 directly, that is to say, on the opposite side with respect to the unloading zone FU of the first conveyor 15.

According to one variant embodiment, the plant 10 (as illustrated in FIG. 1) comprises a high-productivity oven 5, with tunnels T1 and T2 extending for a great length.

In this case, the first carousel 16 for transferring the parisons 2 from the moulding machine 1 to the oven 5 is located at a first end of the oven 5, while the unloading zone where the parisons 2 heated by the oven 5 are transferred to the second carousel 17 is located at the opposite end of the oven 5.

The passage of the parisons 2 (already hot) along a single, long tunnel T2 makes it possible to feed parisons 2 which are already in the right conditions for blow-moulding.

Similarly, when the blow-moulding machine 7 is shut down and with the oven 5 in a configuration for cooling the parisons 3, the stretch of the path coinciding with the tunnel T2 allows the parisons 2 to be suitably cooled and transferred to the first conveyor 15. The first conveyor 15 in turn transfers the cooled parisons 2 to the buffer 14 (as indicated by the arrow FU in the drawing).

In light of this, the zone of the first conveyor 15 which receives the parisons 2 is located at the start of the tunnel T1.

It should be noted that the second conveyor 15a is configured to transfer the parisons 2 from the buffer 14 to the oven 5, when the heating means 6 are on during a machine shutdown period of the moulding machine 1.

In light of this, the parison 2 unloading zone of the second conveyor 15a is located in the free zone at the end of the oven 5 near the second carousel 17 which transfers the parisons 2 to the blow-moulding machine.

In other words, when the moulding machine 1 is stopped, the second conveyor 15a can draw the parisons 2 stored in the buffer 14 and transfer them to the oven 5 operating in the heating configuration (as indicated by the arrow FE) so as not to interrupt feed to the blow-moulding machine 7 and thus keep the plant 10 in operation.

It should be noted that the feeding of the parisons 2 (cold) is effected at a point of the path P such as to force the parisons 2 to go through both tunnels T1 and T2 (in a heating configuration) so that the parisons 2 fed are ready for blow-moulding.

It should be noted that the management unit 9 is connected to the buffer 14 and to the conveyors 15 and 15a and is programmed to control loading or unloading of the parisons 2 according to the working requirements of the machine.

More specifically, the unit 9 starts the automatic unloading of the parisons 2 from the oven 5 through the agency of the first conveyor 15 in response to a signal indicating that the blow-moulding machine 7 is shut down.

Otherwise, the unit 9 starts the automatic feeding of the oven 5 with parisons 2 drawn from the buffer 14 through the agency of the second conveyor 15a, in response to a signal indicating that the moulding machine 1 is shut down.

It should be noted that this operating flexibility is enhanced in a further variant embodiment, not illustrated.

More precisely, the oven 5 is configured to heat and cool different parisons 2 simultaneously.

In a first case, one of the tunnels (T1 or T2) of the oven 5 comprises the heating means 6 and the other tunnel (T2 or T1) of the oven 5 houses the cooling means 11 so as to define consecutive stretches of the oven 5 (first a heating stretch, followed by a cooling stretch, or vice versa).

In a second case, the heating and cooling means 9 and 11 may be positioned on two levels (heating above and cooling below, or vice versa).

Thus, the invention also provides a method for making containers of thermoplastic material in continuous cycle.

The method comprises the steps of:
  moulding thermoplastic material to make parisons 2 having a body 3 with a closed bottom and a neck 4 which defines an opening;
  heating in an oven 5 the parisons 2 feeding out of the moulding machine 1,
  blow-moulding in moulds 8 the parisons 2 heated in the oven 5.

According to the invention, the method comprises a step of switching between the step of heating the parisons 2 in the oven 5 and a step of cooling the parisons 2 in the selfsame oven 5 during a shutdown period of the blow-moulding machine 7 and without interrupting the operation of the moulding machine 1.

Preferably, the method comprises a step of transferring into a buffer 14 the parisons 2 which have been cooled in the oven 5 during the period in which the blow-moulding machine 7 is shut down.

The method further comprises a step of feeding the oven 5 with parisons 2 drawn from the buffer 14 during a period in which the parison moulding machine 1 is shut down.

Preferably, the step of cooling the parisons 2 in the oven 5 comprises generating a flow of cooling fluid directed along the inside and/or outside of the parisons 2.

As regards the oven 5, attention is also drawn to the following.

The oven 5 comprises elements 51 for picking up and transporting the parisons 2. The pickup and transporting elements 51 are connected to the conveyor 13 for transporting the parisons 2 along the predetermined path P within the oven 5.

Preferably, the oven 5 comprises a plurality of cooling cups 52. More specifically, the oven 5 comprises, for each pickup and transporting element 51, one cup 52 for cooling a respective parison 2 coupled thereto.

The cups 52 and the pickup and transporting elements 51 are movable towards and away from each other Preferably, the pickup and transporting elements 51 are movable towards and away from each other along a direction perpendicular to the predetermined path P (which preferably lies in a plane).

Preferably, the cups 52 are connected to respective movable carriers 53 to move from a distal position (away from the respective parisons 2) to a proximal position (relative to the respective parisons 2) where each parison 2 is at least partly inserted in the respective cup 52.

The movable carriers 53 are connected to respective actuators (for example pneumatic or electric). These actuators are preferably connected to the management unit 9, or to another control unit, by which the movements of all the actuators are coordinated (as the parisons are loaded into the oven, when the oven is working in the cooling configuration).

It should be noted that the cup 52 defines a tapered seat in which the parisons 2 can be inserted and housed.

Preferably, the cups 52 are connected to the respective movable carriers 53 through the agency of springs 54. These springs are configured to work by compression.

The springs 54 make the cups 52 elastically movable (along the direction of movement of cup 52 and parison 2 towards each other, in particular along an axis relative to which the cup 52 and the respective parison 2 are aligned) between a position proximal to the respective parisons 2 (where the springs 54 are at rest) and a position distal from the parisons, where the springs 54 are compressed.

Alternatively, or in addition, the cups 52 have respective suction channels 55 connected to suction means.

Alternatively, or in addition, the pickup and transporting elements 51 of the parisons 2 are connected to the conveyor 13 (preferably by respective spindles not illustrated) by springs 56. These springs are configured to work by compression.

The springs 56 make the pickup and transporting elements 51 (and hence the parisons 2 coupled thereto) elastically movable (along the direction of movement of cup 52 and parison 2 towards each other, in particular along the axis relative to which the cup 52 and the respective parison 2 are aligned) between a position proximal to the respective cups 52 (where the springs 56 are at rest) and a position distal from the cups 52, where the springs 56 are compressed.

The examples illustrated in FIGS. 6 and 7 clarify the operation of the springs 54 and 56, which can be used alternatively or in combination (to and with each other and the suction means).

If the spring 54 or 56 were infinitely rigid, the stroke L1 (assigned to the cup 52 in the examples illustrated) would cause the parison 2 to be inserted completely in the cup 52.

Instead, during operation, after the cup 52 and the respective parison 2 have moved towards each other and have come into contact with each other, the spring 54 or 56 is compressed and its length is reduced from X (the length of the spring at rest) to Y, where Y is less than X.

After that, as the resistance offered by the parison 2 to insertion into the cup 52 diminishes (owing to the progressive cooling of the parison 2 which is already partly in contact with the cup 52), the elastic force of the spring 54 or 56 gradually and gently pushes the parison 2 all the way into the cup.

The invention claimed is:

1. A plant for making containers of thermoplastic material in continuous cycle comprising:
 a parison moulding machine configured to make parisons of thermoplastic material having a body with a closed bottom and a neck which defines an opening;
 a heating oven configured to receive the parisons feeding out of the parison moulding machine and equipped with heating means operating on the bodies of the parisons, wherein the oven has a conveyor configured to transport the parisons along a predetermined path within the oven;
 a rotary blow-moulding machine configured to receive the parisons heated in the oven and to blow-mould them in moulds to make the containers,
 characterized in that it comprises a plant management unit configured to switch off, or to reduce the heating power of, the oven heating means and to keep the conveyor operating, during a period when the blow-moulding machine is shut down, wherein the management unit is configured to keep the parison moulding machine operating, during said period when the blow-moulding machine is shut down, whereby the parisons located in the oven can cool down during their transit through the oven.

2. The plant according to claim 1, wherein the management unit is configured to switch off, or to reduce the heating power of, the oven heating means in response to a machine shutdown signal from the blow-moulding machine.

3. The plant according to claim 1, wherein the oven comprises cooling means operating on the parisons, and wherein the management unit comprises a selector configured to switch the oven between a heating configuration where the heating means are on and the cooling means are off, and a cooling configuration where the heating means are off or on low heat and the cooling means are on.

4. The plant according to claim 3, wherein the cooling means comprise a plurality of nozzles configured to strike the parisons with a flow (F) of cooling fluid along at least one stretch of the predetermined path (P) of the parisons.

5. The plant according to claim 4, wherein at least one nozzle of the nozzles is associated with the conveyor, and/or wherein at least one nozzle of the nozzles is located at a fixed position relative to the conveyor so that the parisons travelling along the stretch of the predetermined path (P) are struck by the flow (F) of cooling fluid.

6. The plant according to claim 4, wherein the parisons are moved along the path (P) by a combination of a movement imparted by the conveyor along the path (P) and a rotation of each parison about an axis (Z) of extension of the selfsame parison, wherein at least one of the nozzles is mounted parallel to said axis (Z) so as to direct the cooling fluid axially along the parisons.

7. The plant according to claim 1, wherein the management unit is connected to the blow-moulding machine and to the oven and is programmed to receive a signal representing the operation of the blow-moulding machine, in order to switch off, or reduce the heating power of, the oven heating means automatically in response to a blow-moulding machine shutdown signal.

8. The plant according to claim 1, comprising a buffer connected to the oven by a conveyor which is configured to transfer to the buffer the parisons cooled by the oven when the oven is in a cooling configuration where the heating means are off or operating on low heat.

9. The plant according to claim 8, wherein the buffer is connected to the oven by a second conveyor independent of the first conveyor and configured to transfer the parisons from the buffer to the oven when the oven is in a cooling configuration during a shutdown period of the parison moulding machine.

10. The plant according to claim 9, wherein the management unit is connected to the buffer and to the second conveyor and is programmed to automatically activate oven feed with parisons drawn from the buffer, in response to a machine shutdown signal from the parison moulding machine.

11. The plant according to claim 9, comprising a parison orienting device located between the buffer and the oven (5) to position the parisons drawn from the buffer on the second conveyor according to a predetermined orientation.

12. A method for making containers of thermoplastic material in continuous cycle comprising the following steps:
moulding thermoplastic material in a parison molding machine to make parisons having a body with a closed bottom and a neck which defines an opening;
heating in an oven the parisons feeding out of the parison moulding machine, wherein the oven has a conveyor configured to transport the parisons along a predetermined path within the oven;
blow-moulding, in moulds of a blow-moulding machine, the parisons heated in the oven,
switching between the step of heating the parisons in the oven and a step of cooling, or significantly reducing the heating of, the parisons in the selfsame oven during a shutdown period of the blow-moulding machine, wherein the conveyor and the moulding are kept running during said cooling step.

13. The method according to claim 12, comprising a step of transferring into a buffer the parisons which have been cooled in the oven during the period in which the blow-moulding machine is shut down.

14. The method according to claim 13, comprising a step of feeding the oven with parisons drawn from the buffer during a period in which the parison moulding machine is shut down.

15. The method according to claim 12, wherein the step of cooling the parisons in the oven comprises generating a flow of cooling fluid directed along the inside and/or outside of the parisons.

16. The plant according to claim 1, wherein the oven comprises a carousel which rotates about an axis.

17. The plant according to claim 1, wherein the parison moulding machine is a rotary moulding machine.

18. The method according to claim 12, wherein the oven comprises a carousel which rotates about an axis.

19. The method according to claim 12, wherein the parison moulding machine is a rotary moulding machine.

* * * * *